United States Patent
Elliman et al.

[11] Patent Number: 5,852,695
[45] Date of Patent: Dec. 22, 1998

[54] CONNECTORS FOR USE WITH OPTICAL FIBER APPARATUS

[75] Inventors: Anthony D. Elliman, Grandborough, Nr Rugby; Martin P. McNulty, Long Buckby, both of United Kingdom

[73] Assignee: Lumonics Ltd., United Kingdom

[21] Appl. No.: 823,551

[22] Filed: Mar. 25, 1997

[30] Foreign Application Priority Data

Mar. 27, 1996 [GB] United Kingdom ................. 9606430

[51] Int. Cl.⁶ .................................................. G02B 6/36
[52] U.S. Cl. .............................................. 385/82; 385/78
[58] Field of Search ................................ 385/78, 76, 82

[56] References Cited

U.S. PATENT DOCUMENTS 4,730,889  3/1988  Becker et al. ....................... 385/76 X
5,668,904  9/1997  Sutherland et al. ................. 385/78 X

FOREIGN PATENT DOCUMENTS 0 463 404 A1  1/1992  European Pat. Off. .
1425567       9/1988  U.S.S.R. ................................ 385/78
2062893       5/1981  United Kingdom .
2184257       6/1987  United Kingdom .

Primary Examiner—John D. Lee
Assistant Examiner—Juliana K. Kang
Attorney, Agent, or Firm—Nixon & Vanderhye P.C.

[57] ABSTRACT

A connector for an optical fibre comprises a body which receives a male connector having a conduit termination and a lens-fibre cell. A rotatable sleeve on the body serves via a slipper to move a first floating ball radially inward to clamp the lens-fibre cell against a V-bar or other support and, simultaneously, to move a plurality of angularly spaced floating balls to axially clamp the conduit termination. A ratchet is provided to avoid disconnection other than in a controlled manner by release of a locking collar.

20 Claims, 5 Drawing Sheets

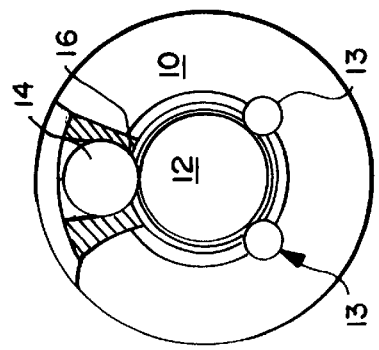
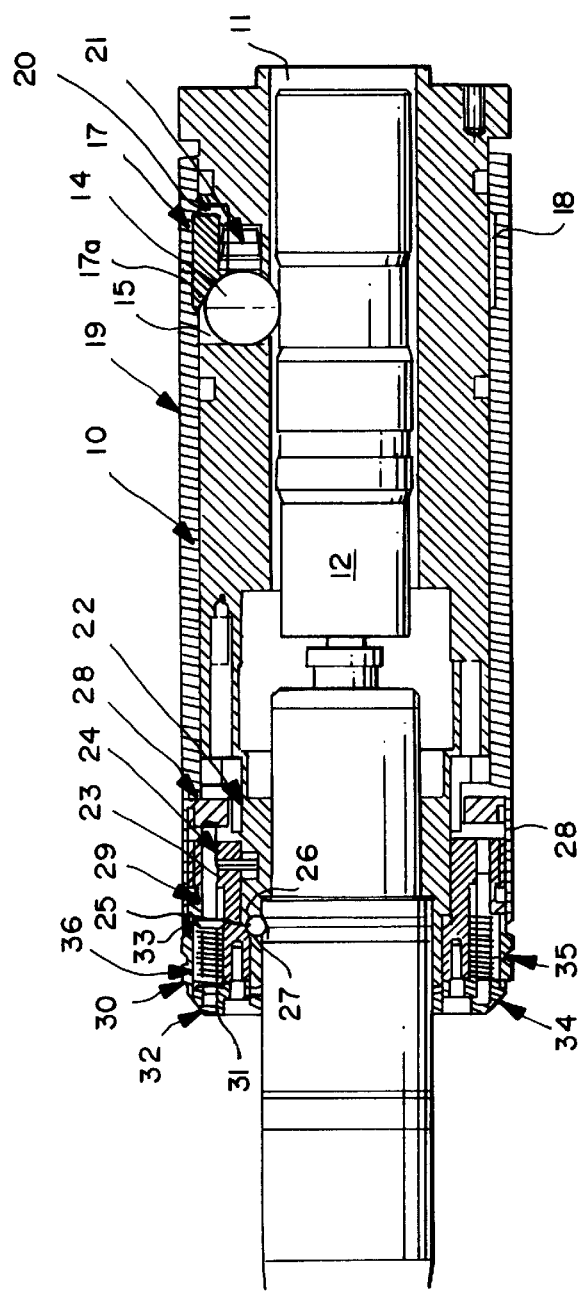

CONNECTORS FOR USE WITH OPTICAL FIBER APPARATUS

FIELD OF THE INVENTION

This invention relates to connectors. In particular, but not exclusively, it relates to connectors for optical fibres. Connectors are used at one end of an optical fibre to connect a laser to the fibre so that the laser beam from the laser is transmitted to the fibre, and at the other end of the fibre a connector is required between the fibre and a beam delivery head. The connectors should preferably be able to lock and release by relatively simple operations.

The diameter of a laser beam of the type to be conveyed by an optical fibre is generally significantly larger than the diameter of the fibre core. For example, a fibre core diameter appropriate for transmission of laser beams may be in the range of 0.2 to 1.0 mm. The diameter of the laser beam, however, will normally be at least 5 mm, typically 10 mm. Thus, it is necessary to reduce the diameter of the laser beam to match the core diameter. It is usually achieved by using a positive lens which focuses the laser beam on to the optical fibre. In order for there to be satisfactory coupling of the laser beam, via a lens into a fibre, there must be a correct and stable positional relationship between the laser beam, the lens and fibre. Primarily, the axes of the beam, the lens and the fibre must be parallel and coincident. If they are not, then various unwanted effects can occur, such as poor beam transmission efficiency, optical damage to the fibre assembly or a degraded output beam.

If a connector is used, between the laser and the fibre, then it can be located either between the laser and the lens, or between the lens and the fibre. It is becoming increasingly common to use the former of these, i.e. to use a connector between the laser and the lens. In this case, the lens can be mounted in a fixed cell with the end of the optical fibre. This lens-fibre cell allows the correct positional and angular relationship to be maintained between the lens and the fibre. The connector which is located between the laser and the cell must then ensure that the respective axes of the laser beam and the cell are parallel and coincident. The ideal situation is shown in FIG. 1(*a*) in which these conditions are realised. FIG. 1(*b*) shows a situation in which the beam is parallel to the axis of the lens-fibre cell but not coincident. This will affect the output beam cone angle and degrade the output beam. FIG. 1(*c*) shows an example in which the laser beam is not parallel to the axis of the fibre cell. This results in very poor beam transmission and increased fibre output beam cone angle.

Accordingly, a connector between the laser and the lens-fibre cell must ensure that the respective axes of the laser beam and the cell are parallel and coincident. This is often achieved by clamping the cell in contact with a 'V-block'. Alternatively, the cell may be clamped in contact with a 'V-bar', which is provided by two parallel spaced apart cylindrical rods held in a rigid relationship. Other types of support are available.

Because the optical fibre is slender and not therefore mechanically strong, it is usually protected by means of a coaxial protective sleeve or conduit which also usually performs other safety related functions. This conduit is mechanically strong and can resist pull and torsional forces on the fibre assembly, such as may be exerted when guiding a beam delivery head using a robot. There is then a requirement to secure the end of the conduit to a connector in such a way that forces exerted on or by the conduit are not transmitted to the optical fibre itself. In practice, the optical fibre is passed through the conduit and terminates at each end in a lens-fibre cell which incorporates the end of the fibre and an associated coupling lens. Similarly, the conduit is terminated at each end by an assembly known as a conduit termination through which the optical fibre passes and which is loosely connected mechanically to the lens-fibre cell so as to take the strain off the optical fibre whilst still allowing some free axial and angular play of the optical fibre and the lens-fibre cell with respect to the conduit termination.

The combined assembly of the lens-fibre cell and the conduit termination is shown in FIG. 2. In the figure, a conduit 1 is terminated by a conduit termination 2 which is loosely connected by a link 3, through which the fibre passes, to the lens-fibre cell 4. The optical beam is output from the distal end 5 of the lens-fibre cell. A groove 6 is provided in the conduit termination for securing this axially and a recess in the form of a relief 7 is provided on the lens-fibre cell to clamp the fibre cell on to a V-bar for example.

It will be appreciated that two separate actions are necessary with the above fibre connector, firstly that of securing the conduit termination axially; and secondly, of clamping the lens-fibre cell to the V-bar. Up to now, these actions have been carried out by two separate mechanical means. The function of securing the conduit termination axially is normally effected by means of a screw-on clamp ring. The function of clamping the fibre lens cell on to the V-bar is effected by various clamping means, for example by means of a leaf spring, alternatively, transverse clamping force may be exerted by means of an axially driven wedge. The force exerted by a leaf spring may be insufficient to maintain constant contact of the cell with the V-bar. An axial wedge arrangement may maintain constant contact but can involve a tedious and time-consuming operation to clamp or release the cell.

Alternatively, the lens need not be mounted in the same cell as the fibre; the lens can be separately mounted and a fibre cell provided which contains various protective optical elements in addition to the fibre. A fibre cell has similar connection requirements to a lens-fibre cell.

The present invention arose out of an attempt to provide an improved connector and one object of the present invention is to provide a connector and method of connection in which both functions of securing the conduit termination axially and clamping a fibre cell or a lens-fibre cell on to a V-bar or other support can be carried out simultaneously and with relative ease.

SUMMARY OF THE INVENTION

According to the present invention there is provided a connector comprising a body providing a socket for receiving an inserted body; a sleeve rotatable relative to the body and a plurality of floating transfer elements retained within the body, the floating transfer elements being caused to move towards the inserted body by rotation of the sleeve so as to clamp the inserted body at two separate longitudinally-spaced positions, characterised in that rotation of the sleeve causes at least one of the floating transfer elements to exert an axial clamping force against one part of the inserted body, and also causes at least one of the floating transfer elements to exert a radial clamping force against a second part of the inserted body, longitudinally spaced from the first part.

Embodiments of the invention will now be described, by way of example only, with reference to the accompanying drawings in which:

BRIEF DESCRIPTION OF THE DRAWINGS

FIG. 3 shows a female connector according to the present invention, together with an inserted male connector;

FIG. 4 shows a partial cross section through FIG. 3, at the plane bisecting ball 14;

DESCRIPTION OF THE PREFERRED EMBODIMENTS

Figure 1A:
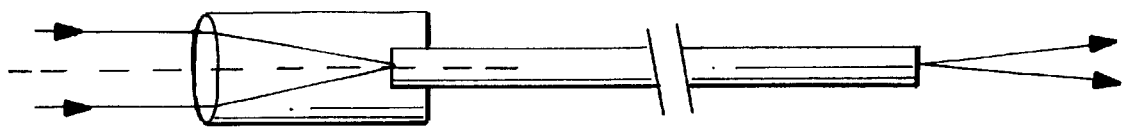
FIGS. 1(*a*), 1(*b*), and 1(*c*) show schematically configurations of a laser beam, a lens and an optical fibre.
Figure 1B:
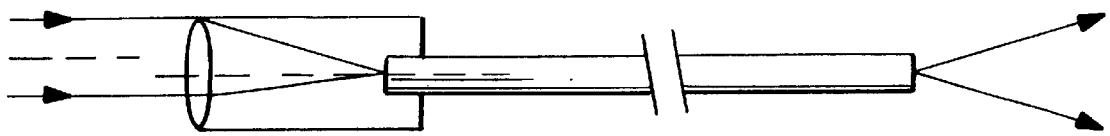
Figure 1C:
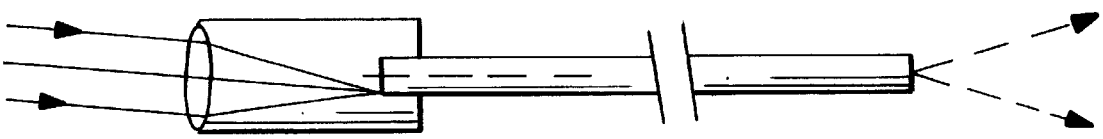
Figure 2:
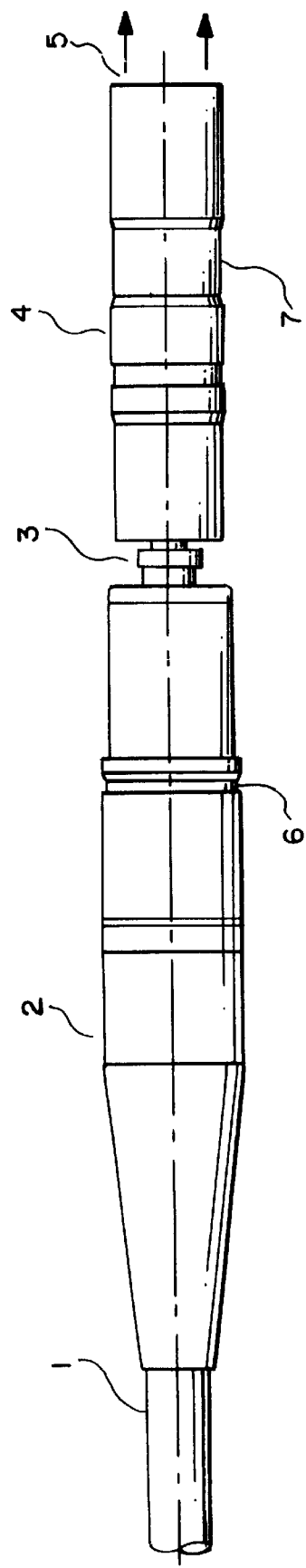
FIG. 2 shows a male connector.
Figure 5:
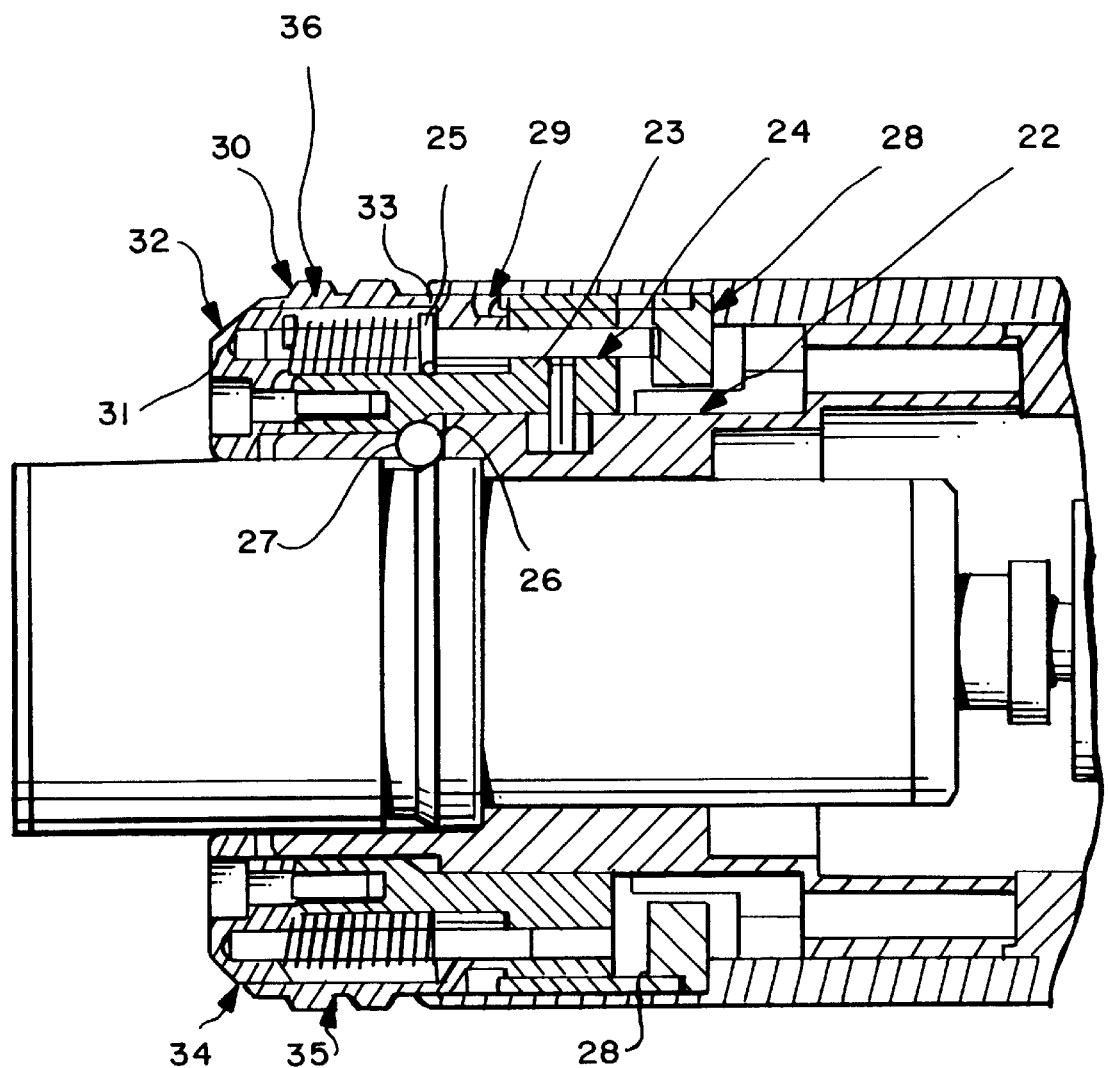
FIG. 5 is an enlarged view of part of FIG. 3.

Referring to FIGS. 3, 4 and 5, there is shown a female connector according to the present invention, connected to a male type connector as shown in FIG. 2. The male connector may be provided at one or both ends of an optical fibre. The male type connector is usually custom-made or designed to suit the female connector. FIG. 5 shows an enlarged view of the left hand part of FIG. 3 for clarity.

The female connector comprises an elongate hollow body 10 defining a tubular opening 11 in to which a male connector 12 (as shown in FIG. 2) may extend as shown in FIG. 3. The body 10 houses two solid cylinders 13 mounted axially on the lower part of the internal surface 11 of the body angularly spaced apart with respect to the longitudinal axis of the body, by about 90°. The cylinders are rigidly mounted against the body to form a V-bar assembly and are shown in FIG. 4. The male connector 12 lies upon these cylinders 13 in use and is forced against them by a floating contact element in the form of a ball 14 retained within body 10. FIG. 4 shows how if the ball 14 is forced downward it forces the male part 12 firmly against the cylinders 13 to correctly position part 12. The ball is positioned directly opposite the mid-point of the shortest chord between the two cylinders and is located within the body such that it is constrained circumferentially and axially but with limited, controlled movement radially. The ball is therefore held in a chamber 15 which is of circular cross section of diameter similar to that of the ball but having a reduced diameter opening 16 through which the ball may partially protrude so that the ball has limited radial movement. A 'slipper' 17 is mounted in a circumferential internal groove 18 in a locking sleeve 19 lying external to and concentric with the body. The slipper has a tapered portion 17a at the area of contact with ball 14 such that as the slipper is moved towards the left in the figure the ball is pushed inwardly. The slipper is constrained by an axial groove 20 in the body against circumferential movement whilst allowing limited axial movement back and forth longitudinally and is held in place by a compression spring 21 which forces the slipper into groove 18.

The locking sleeve is rotatable with respect to the body and extends part way over a nose portion 22 of the body. Via an internal thread, the locking sleeve is screwed on to a fibre lock ring 23. Ring 23 may slide axially over the nose 22 and is prevented from rotating with respect to the nose by a radial pin 24 running in an axial groove in the nose. The lock ring 23 retains three floating contact elements in the form of balls 25 of which only one is shown. The balls 25 are mounted equiangularly around the internal surface of the lock ring 23 within radial holes 26 in nose 22. Similar to slipper 17, the contact surface 27 of the lock ring 23 with each ball 25 is inclined so that movement of the lock ring 23 towards the right pushes the balls 25 radially inwards.

The balls 25 are of smaller diameter than the ball 14. Balls 25 are located at a position where they will engage with groove 6 of the conduit termination whereas ball 14 is located such as it acts upon relief 7 of the lens-fibre cell. The locking sleeve 19 extends axially by a sufficient distance that it acts upon both lock ring 23 and slipper 17 simultaneously as it is rotated.

In operation, the male portion of the connector, comprising conduit termination 2 and the lens-fibre cell 4 is inserted into the female part (the receiver) as shown in FIG. 3. A single locking/clamping operation is then achieved by rotation of the locking sleeve. This acts to cause the slipper 17 to move to the left and thereby cause the ball 14 to be pushed in radially on to the lens-fibre cell and also causes the lock ring 23 to be moved to the right, thereby to push the balls 25 radially on to an inclined wall of the groove 6 of the conduit termination to exert axial pressure to secure the conduit termination axially. Thus, simultaneously, the two actions of securing the conduit termination axially and of clamping the lens-fibre cell on to the V-bar are achieved. The torque applied by hand to the locking sleeve 19 is proportioned by the reaction forces developed by the contact elements as they respectively grip the conduit termination and the lens-fibre cell.

Thus, in one easy action the male connector is correctly located, positioned and clamped.

The thread on the lock ring 23 is preferably of multi-start type, and is chosen such that full locking is achieved in half a turn for convenience. Preferably, a left-hand thread is used to maintain the convention of a clockwise rotation for locking.

The receiver further comprises an internal ratchet wheel 28 carried by the locking sleeve and which is serrated on one face (the leftmost face in the figure). Three pawls or pins 29 are mounted equiangularly around the body to impinge upon the serrated face of the ratchet wheel. More or less than three pins may be provided. The pins are all parallel to the receiver axis and pass through clearance holes in the fibre lock ring and a release collar 30 into guide holes 31 in the inner face of an end cap 32. A coil spring 36 surrounds and is coaxial with part of each pin and acts between the end cap 32 and a shoulder 33 on the pin to press the pin into contact with the ratchet wheel 28.

Three additional equispaced pins 34 are located in the end cap 32 and these serve as guide pins for three further coaxial coil springs 35 which serve to press the release collar 30 against the fibre lock ring and away from the shoulders on pins 29.

The ratchet pins, only one of which is engaged with the wheel at any time by virtue of appropriate selection of ratchet pitch with respect to pin separation, prevent counter-rotation of the locking sleeve, after connection, due to the ratchet effect and therefore prevent the clamping forces from being released inadvertently. The ratchet is advantageously of high resolution (i.e. large number of serrations) to achieve small-increment clamping forces.

In order to effect disconnection a deliberate movement must be made in which the pins 29 are disengaged from the ratchet wheel 28 and this is achieved by axial movement manually (to the left in FIG. 3) of the release collar 30 against the shoulders on the pins 29 and so compressing the springs 32 and 35. The release collar is knurled, ribbed or otherwise shaped to assist its manipulation. With the release collar held in this position, the locking sleeve can then be counter-rotated, which enables the respective floating contact elements 25 and 14 to have some free play radially and thus allows them to revert to a position in which the male part of the connector may be easily withdrawn.

This arrangement gives added security to the connector as, normally, a two-handed operation will be necessary to disconnect the apparatus, one hand pulling back on the release collar 30 whilst the other hand counter-rotates locking sleeve 19.

In a variation, larger ratchet pins may be used. The release collar 30 may be replaced by a release button, latch or other means.

Instead of balls, the floating contact elements may be of other shapes, such as cylinders, rollers or profiled blocks for example. Instead of the ratchet wheel being serrated on one face, it may be toothed around edge and be locked by lever-type pawls.

It should also be noted that, instead of a V-bar, a true V-block (i.e. a block having a V surface machined into it) may be incorporated, if a large diameter connector can be tolerated. Alternatively other types of supports may be used for clamping a cell 4.

The connector used is not limited in use to fibre connectors and may be used for any connection in which correct axial location and clamping is required. Means may be provided for correctly circumferentially as well as axially locating a connector, such as by shaping parts so that they only fit together in one relative angular disposition.

In an alternative embodiment the lens is not mounted in the same cell as the fibre; the lens can be separately mounted on a laser rail and a separate fibre cell is provided, which contains various protective elements in addition to the fibre. Such a construction may be useful where high output power is required, in which case a lens capable of fitting within the diameter of the fibre cell may not be able to withstand a sufficiently high power density. In addition, it is often required to be able to adjust the lens laterally, when necessary, to compensate for lateral misalignment between the focussed laser beam (at the input face of the fibre) and the fibre core. Such adjustment is not possible when the lens is mounted in a single lens-fibre cell.

It has been mentioned above that support structures other than V-bars may be used in embodiments of the invention. One such alternative structure is shown in FIGS. 6 and 7.

Figure 6:
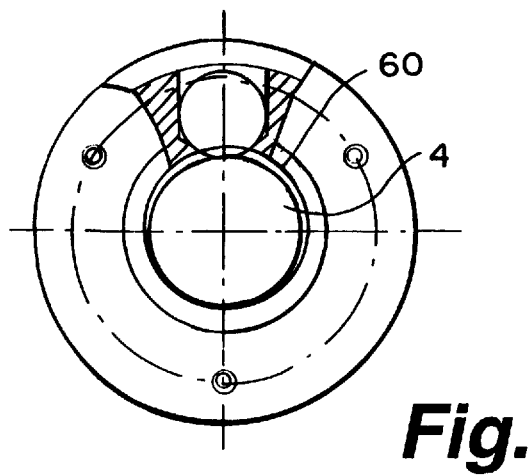
FIG. 6 shows a partial cross-section through an alternative embodiment of the invention.
Figure 7:
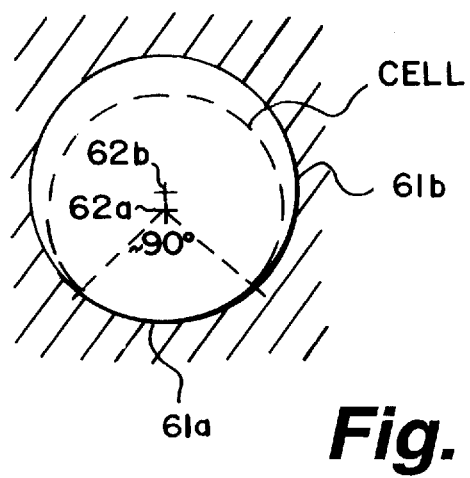
FIG. 7 shows schematically an enlarged explanatory view of FIG. 6.

Referring to FIG. 6, in an alternative embodiment the V-bar is omitted. Instead, the fibre cell or lens-fibre cell 4 is clamped into a location part formed by a bore 60 within the body. Bore 60 is more clearly seen in FIG. 7 and is formed of two circular arcs, 61a and 61b. The lower arc 61a is of diameter nominally equal to that of the fibre cell and the upper arc 61b is of greater diameter. The centres of the two arcs are shown at 62a and 62b. The intersections of the two arcs lie in the lower semicircle. In a preferred embodiment the intersections of the two arcs lie approximately 90° apart. However in practice the angular extent of the lower arc may be in a range from a value considerably less than 90°, up to 180°. The terms 'upper' and 'lower' in this specification merely refer to the disposition as shown in the drawings. The connector may of course be used in any disposition.

The fibre cell 4 is clamped, by means of ball 14 as before, to the lower arc 61a and the longer, larger diameter arc 61b provides clearance to allow insertion of the fibre cell. The radii of the fibre cell and the shorter arc 61a are preferably such that at a maximum metal condition, the cell is nominally size-and-size to the arc, effectively giving a contact area, whilst at a minimum metal condition there is line contact between the two with only very small lateral displacement.

The term 'maximum metal' is intended to mean the condition where the fibre cell is of maximum permitted diameter (as allowed by its engineering tolerances) and the bore is of minimum permitted diameter. 'Minimum metal' then means the converse—fibre cell of minimum permitted diameter and bore of maximum permitted diameter.

What is claimed is:

1. A connector comprising a body providing a socket for receiving an inserted body; a sleeve rotatable relative to the body, and a plurality of floating transfer elements retained within the body, the floating transfer elements being caused to move towards the inserted body by rotation of the sleeve so as to clamp the inserted body at two separate longitudinally-spaced positions, wherein rotation of the sleeve causes at least one of the floating transfer elements to exert an axial clamping force against one part of the inserted body, and simultaneously also causes at least one of the floating transfer elements to exert a radial clamping force against a second part of the inserted body, longitudinally spaced from the first part.

2. A connector as claimed in claim 1, wherein the connector further comprises a rigid static support structure on an inner surface of the connector; wherein one of the floating transfer elements is caused to provide a clamping force to clamp the inserted body against the support structure.

3. A connector as claimed in claim 2, wherein the rigid support structure comprises two rigid, spaced apart, longitudinal rods forming a 'V-bar'.

4. A connector as claimed in claim 2, wherein the rigid support structure comprises a bore which in cross-section is formed by an upper and a lower circular arc, the upper arc being of larger diameter.

5. A connector as claimed in claim 4, wherein the lower circular arc has an angular extent less than or equal to 180°.

6. A connector as claimed in claim 4, wherein the inserted body has a radius substantially the same as the radius of the lower circular arc.

7. A connector as claimed in claim 2, wherein the inserted body is a male connector for an optical fibre, comprising a fibre cell including an external relief against which one of the floating transfer elements impinges to clamp the cell radially against the rigid support structure, and a conduit termination including an external groove having a wall against which two or more further transfer elements impinge to exert a partially axial force towards the fibre cell.

8. A connector as claimed in claim 2, wherein the inserted body is a male connector for an optical fibre, comprising a lens-fibre cell including an external relief against which one of the floating transfer elements impinges to clamp the cell radially against the rigid support structure, and a conduit termination including an external groove having a wall against which two or more further transfer elements impinge to exert a partially axial force towards the lens-fibre cell.

9. A connector as claimed in claim 2 wherein the rigid, static, support structure is permanently attached to the body.

10. A connector as claimed in claim 1, wherein two or more floating transfer elements are angularly spaced apart and arranged to provide an axial clamping force against a part of the inserted body.

11. A connector as claimed in claim 10, further comprising a non-rotatable member having an inclined face which is caused to move axially by rotation of the sleeve to exert a partially axial force at the inclined face against the angularly spaced floating transfer elements to clamp said elements against the inserted body.

12. A connector as claimed in claim 1, wherein the body comprises a chamber in which one of the floating transfer elements is located, the chamber being shaped to constrain the element from lateral and longitudinal movement and having a radially inward opening, and said transfer element having a dimension greater than the corresponding dimension of the opening such that said element can partially protrude from the opening to have limited movement radially within the chamber, and a slipper element having an inclined face, the slipper element being caused to move axially when the sleeve is rotated to bear upon said transfer element at said inclined face to cause said transfer element to exert a radially compressive force.

13. A connector as claimed in claim 12, wherein recesses are provided in the body and sleeve, the slipper being held in said recesses and urged towards the recess in the sleeve.

14. A connector as claimed in claim 1, further comprising a ratchet wheel, one or more pawls, a means for providing an urging force for urging said pawls into engagement with the ratchet wheel to prevent rotation of the sleeve in a disconnecting direction, and a release means axially movable, against said urging force, to release the or each pawl from the ratchet wheel to allow disconnection.

15. A connector as claimed in claim 14, wherein the release means is a release collar.

16. A connector as claimed in claim 14, wherein said means for providing an urging force comprises a spring associated with each pawl.

17. A connector as claimed in claim 1, and arranged to connect an optical fibre to an external apparatus.

18. A connector as claimed in claim 1, wherein the inserted body comprises two directly connected bodies, said axial clamping force being exerted on one of said directly connected bodies, and said radial clamping force being exerted on said other directly connected body.

19. A connector as claimed in claim 1, wherein the sleeve has a screw thread which cooperates with an external thread on the non-rotatable member, the external thread being a multi-start thread.

20. A connector as claimed in claim 1, wherein said transfer elements comprise balls or cylinders.

* * * * *